L. M. RUMLEY & C. H. McFARLING.
CULTIVATOR.
APPLICATION FILED FEB. 25, 1913.
1,092,665.
Patented Apr. 7, 1914.
5 SHEETS—SHEET 1.
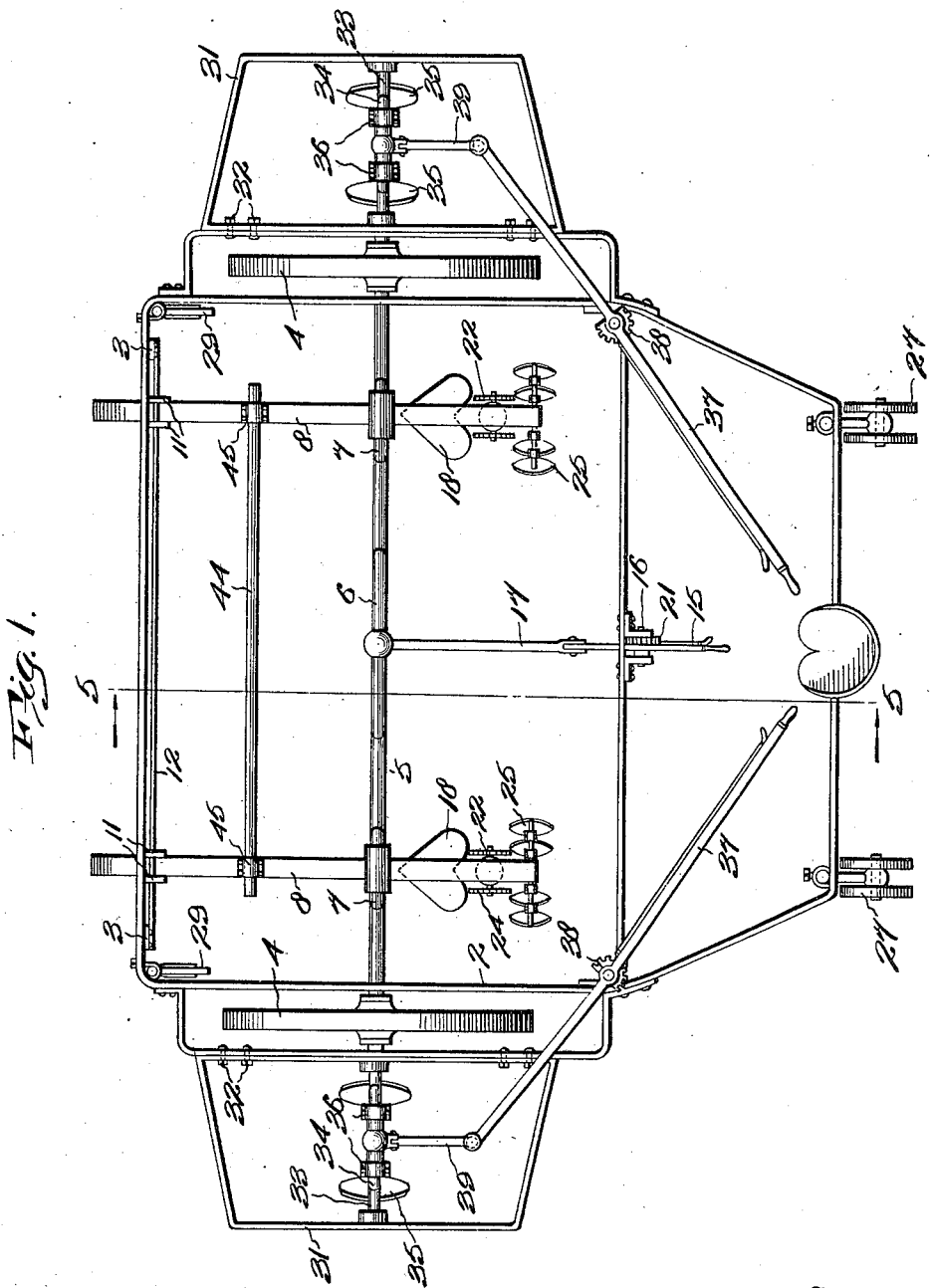
Witnesses
Edwin J Beller.
H. C. Rimm
Inventors.
L. M. Rumley and
C. H. McFarling.
By Wilkinson, Witherspoon & MacKay
their Attorneys

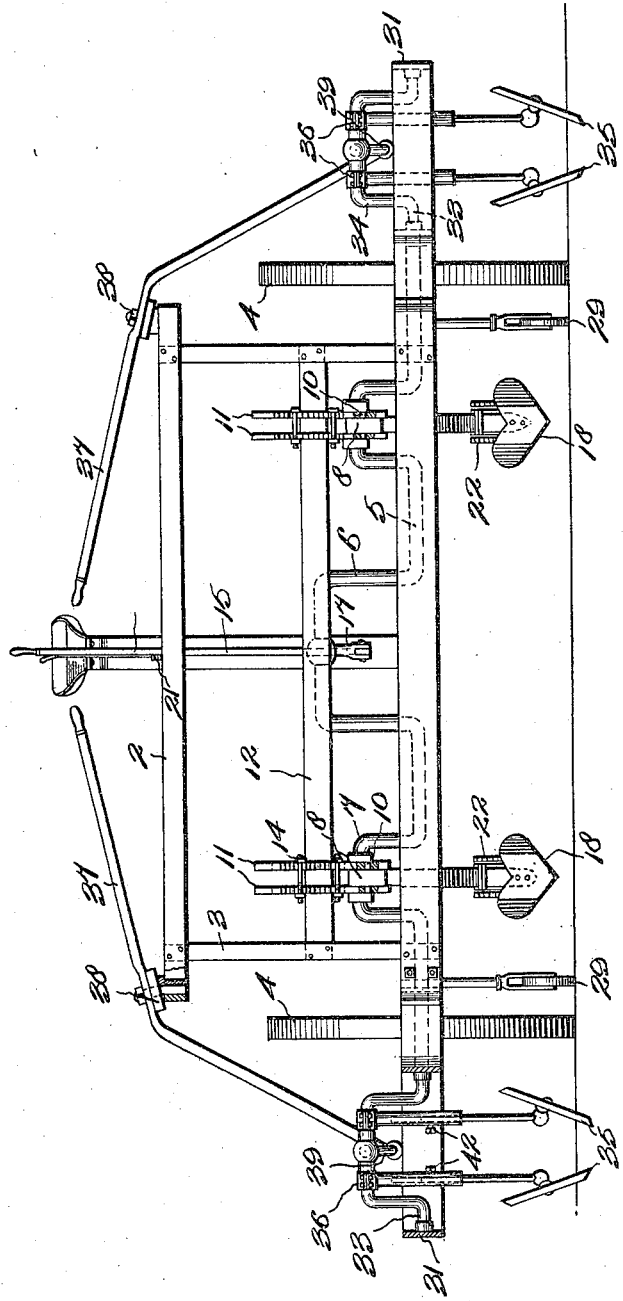

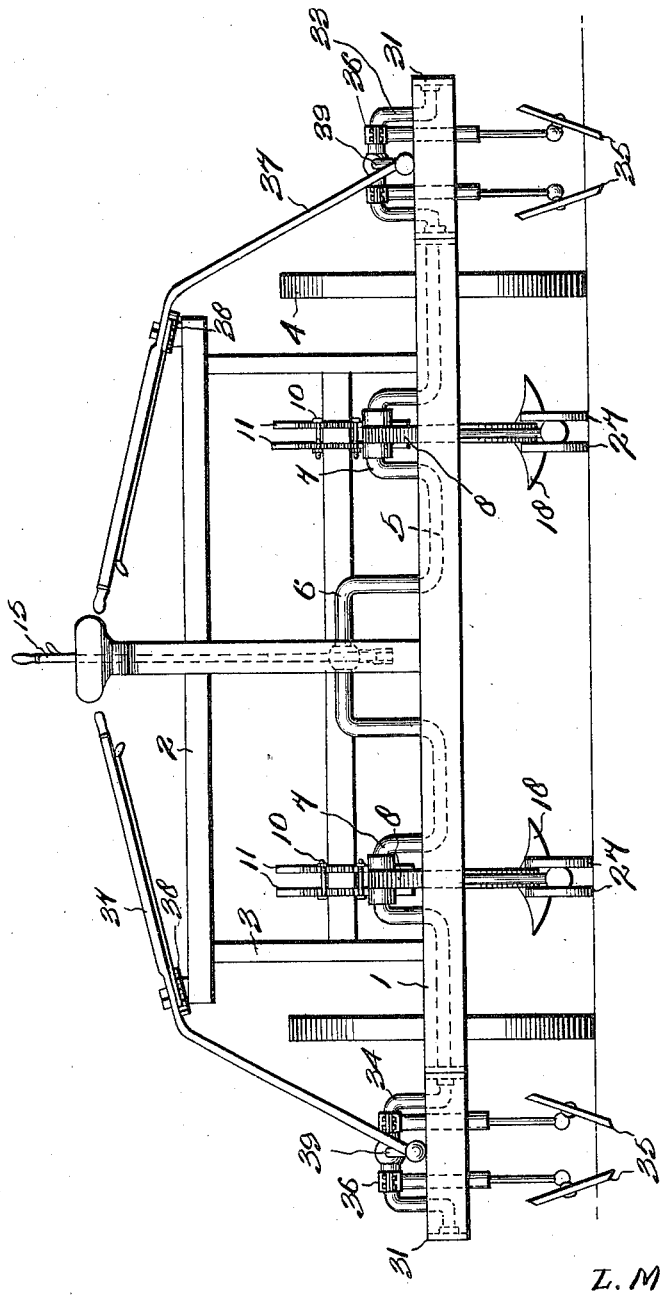

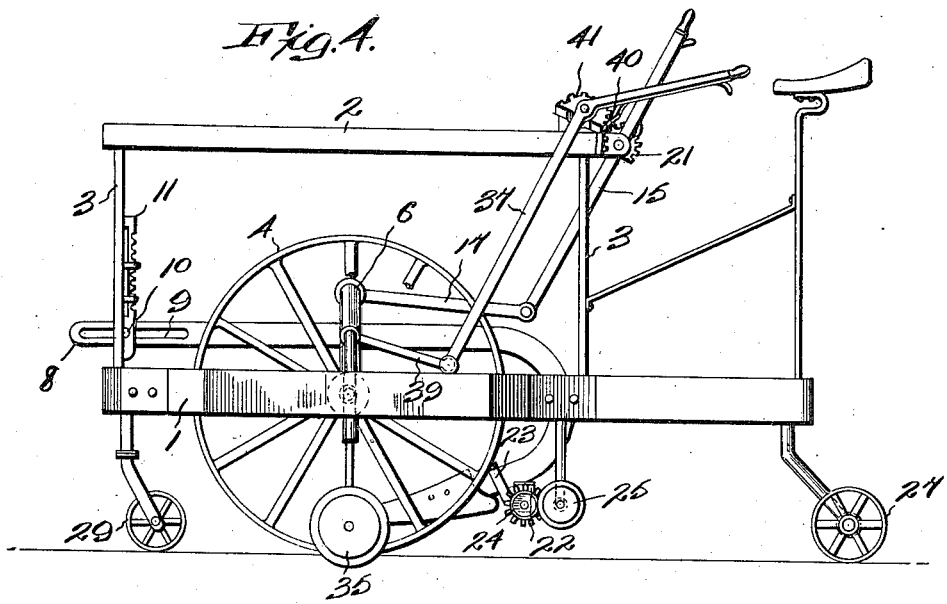
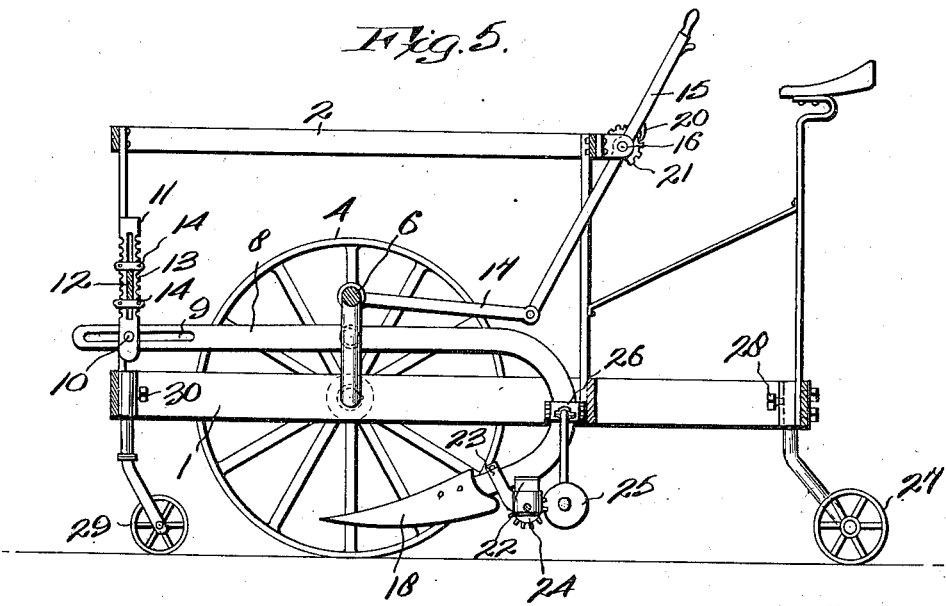

L. M. RUMLEY & C. H. McFARLING.
CULTIVATOR.
APPLICATION FILED FEB. 25, 1913.
1,092,665.
Patented Apr. 7, 1914.
5 SHEETS—SHEET 5.
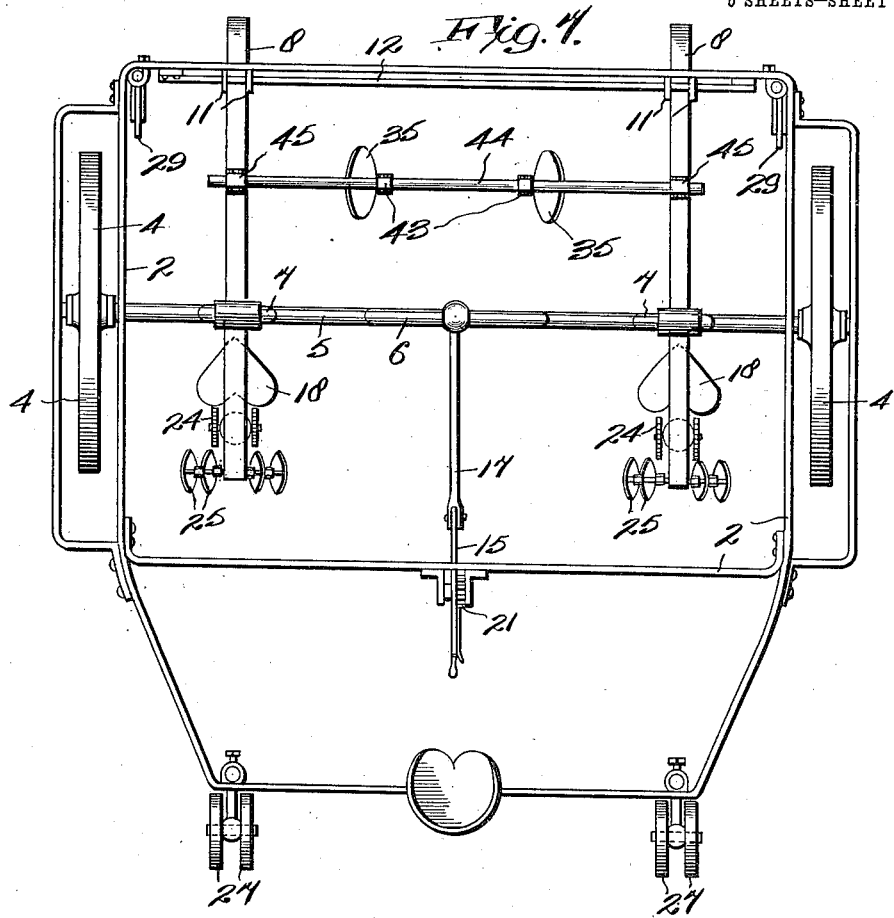
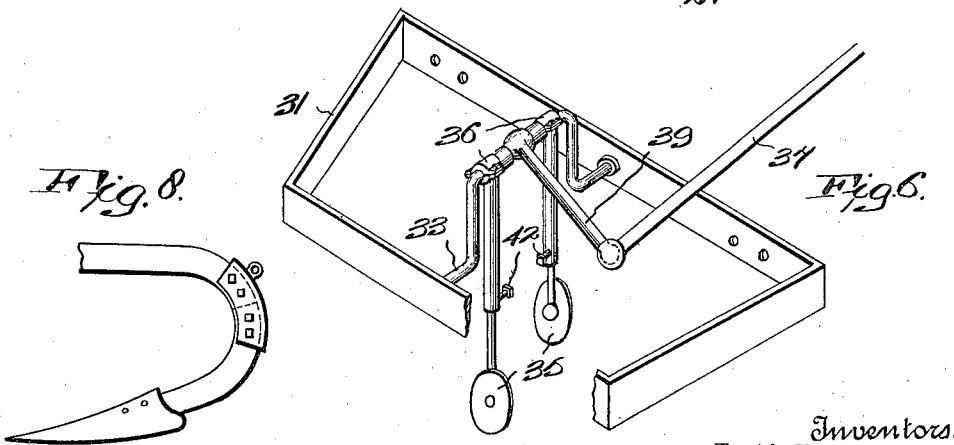
Witnesses
Inventors
L. M. Rumley and
C. H. McFarling

UNITED STATES PATENT OFFICE.

LUTHER M. RUMLEY AND CHARLES H. McFARLING, OF SUPPLY, OKLAHOMA.

CULTIVATOR.

1,092,665.  Specification of Letters Patent.  Patented Apr. 7, 1914.

Application filed February 25, 1913. Serial No. 750,575.

*To all whom it may concern:*

Be it known that we, LUTHER M. RUMLEY and CHARLES H. MCFARLING, citizens of the United States, residing at Supply, in the county of Woodward and State of Oklahoma, have invented certain new and useful Improvements in Cultivators; and we do hereby declare the following to be a full, clear, and exact description of the invention, such as will enable others skilled in the art to which it appertains to make and use the same.

Our invention relates to improvements in cultivators, and it consists in the constructions, combinations and arrangements herein described and claimed.

The object of our invention is to provide an improved cultivator which can be readily adapted for efficient use as a two row lister and cultivator combined or as a planter, or as a plow and harrow for preparing the ground for wheat.

In the accompanying drawings, forming a part of this application, in which similar reference symbols indicate corresponding parts in the several views:—Figure 1 is a plan view, illustrating one embodiment of our invention; Fig. 2 is a front elevation of the construction shown in Fig. 1; Fig. 3 is a rear elevation of the construction shown in Fig. 1; Fig. 4 is a side elevation of the construction shown in Fig. 1; Fig. 5 is a section on the line 5—5 of Fig. 1; Fig. 6 is a detail perspective, partly broken away, of one of the auxiliary end frames, and the steering wheels carried thereby; Fig. 7 is a plan view similar to Fig. 1, with the detachable auxiliary end frames and steering wheels carried thereby removed; and Fig. 8 is a fragmentary side elevation of a modified plow beam having a detachable lower end secured in place by a casting.

Referring to the drawings, 1 and 2 indicate the lower and upper members of the main cultivator frame connected by uprights 3 and supported by ground wheels 4. A shaft 5 is journaled in said frame and bent to provide a central crank 6 and two side cranks 7, which latter extend through or are otherwise pivotally secured to a pair of plow beams 8. The forward ends of the plow beams 8 are provided with slots 9 for slidably receiving pins, or rollers 10 secured between a pair of slotted plates 11 slidably mounted on a front cross member 12 of the frame; said plates 11 being provided with series of notches 13 adapted to be engaged by a pair of U-shaped clamps, or clips 14 for adjustably clamping said plates to the cross member 12 to raise or lower the forward ends of the plow beams 8. A hand lever 15 is pivoted to the frame at 16 and connected by a link 17 to the central crank 6 of the shaft 5, for oscillating said shaft to raise or lower the plow beams 8 to properly set the plows 18 carried thereby; said lever 15 being shown provided with the usual spring latch 20 for engaging a toothed segment 21 fixed on the frame for locking the parts in their several positions.

A planter 22 is clamped to each plow beam 8 at 23, and provided with an operating wheel 24 having a toothed periphery for engaging the ground to operate the planter, thereby eliminating the troublesome gearing, or other drive connections, employed in previous forms of planters and insuring a positive and uniform action.

A gang of inclined disk wheels 25 are clamped to each plow beam 8 at 26 in position to level the ridges thrown up by the plow 18; thereby providing simple and efficient means for covering up seed deposited by the planter 22, or for leveling the ground to prepare it for the use of a drill without the necessity of harrowing.

The cultivator frame is provided with rear guide wheels 27 positioned to track with the plows 18, and adjustably mounted in any suitable way, as by set screws 28. A pair of front guide wheels 29 are similarly adjustably secured to the frame by set screws 30; said wheels 29 supporting the front of the frame, and eliminating the necessity of employing a tongue for the draft horses.

A pair of auxiliary frames 31 are detachably connected to the respective ends of the main frame, as by bolts 32, and are provided with journals for shafts 33 bent to provide cranks 34; a set of inclined disk wheels 35 being clamped at 36 to each of said cranks 34. A pair of levers 37 are pivoted to the main frame at 38 and connected by links 39 to the respective cranks 34 for oscillating the latter to raise or lower the steering wheels 35 carried by said cranks; said levers 37 being provided with the usual spring latches 40 for engaging toothed segments 41 fixed on the frame for locking said levers in their several positions. This provides an improved construction by which the sets of steering wheels 35 can be shifted into position to ride on the ground, or to travel in a previously formed plow furrow. For example, when driving the cultivator to form the first two furrows by the plows 18, the levers 37 will be shifted to elevate both sets of steering wheels 35 to the level of the bottom of the ground wheels in order to enable said steering wheels to ride on the ground. After the first plow furrows have been formed, the set of steering wheels 35 on the end of the cultivator adjacent to such previously formed furrows are lowered to travel therein, and the steering wheels 35 on the other end of the cultivator are shifted to the level of the ground wheels 4 in order to ride on the ground. As shown in the drawings, the steering wheels 35 are inclined for overcoming the tendency to climb out of the furrow, and said wheels 35 can be readily adjusted to furrows of different depths in any suitable manner, as by set screws 42.

When it is desired to cultivate, or relist, between rows of plants which have been previously cultivated, one set of steering wheels 35 is removed and attached at 43 to a bar 44 rigidly secured at 45 to the plow beams 8. In this arrangement, the bar 44 will carry the steering wheels 35 upwardly and downwardly with the plow beams 8, and no additional adjusting means is necessary.

We have illustrated and described preferred and satisfactory constructions, but changes could be made within the spirit and scope of our invention.

We claim—

1. In a cultivator, the combination of a frame, a pair of plow beams carried thereby, sets of steering wheels carried at each side of said frame, shiftable means for independently raising and lowering said sets of wheels to ride on the ground or to travel in a previously formed plow furrow, and means for adjusting said steering wheels to furrows of different depths.

2. In a cultivator, the combination of a main frame, auxiliary frames detachably secured to the respective ends of said main frame, crank shafts journaled in said auxiliary frames, sets of steering wheels secured to the cranks of said shafts, and means for independently actuating said crank shafts to raise and lower the steering wheels secured thereto.

In testimony whereof, we affix our signatures, in presence of two witnesses.

LUTHER M. RUMLEY.
CHARLES H. McFARLING.

Witnesses:
FRANK L. WIGLE,
E. F. HISEY.

---

Copies of this patent may be obtained for five cents each, by addressing the "Commissioner of Patents, Washington, D. C."